United States Patent [19]
Schulze

[11] 3,880,664
[45] Apr. 29, 1975

[54] METHOD FOR EXTRUSION
[76] Inventor: Herbert C. Schulze, 2310 Mar E. St., Tiburon, Calif. 94920
[22] Filed: Aug. 5, 1971
[21] Appl. No.: 169,404

[52] U.S. Cl. .................. 106/99; 106/97; 106/98; 264/333
[51] Int. Cl. .............. C04b 7/02; C04b 15/16
[58] Field of Search ............... 106/99, 97; 264/333

[56] References Cited
UNITED STATES PATENTS

| | | | |
|---|---|---|---|
| 1,317,525 | 9/1919 | Romano | 106/98 |
| 1,977,158 | 10/1934 | Thurman et al. | 106/99 |
| 2,144,213 | 1/1939 | Bassett et al. | 106/99 |
| 2,410,954 | 11/1946 | Sharp | 106/98 |
| 3,219,467 | 11/1965 | Redican et al. | 106/99 |
| 3,529,981 | 9/1970 | Hawkins et al. | 106/99 |
| 3,549,737 | 12/1970 | Schulze | 106/315 |
| 3,552,985 | 1/1971 | Hawkins | 106/99 |
| 3,597,249 | 8/1971 | Shannon | 106/99 |
| 3,650,785 | 3/1972 | Ball et al. | 106/90 |
| 3,661,603 | 5/1972 | Nicol | 106/90 |

*Primary Examiner*—Delbert E. Gantz
*Attorney, Agent, or Firm*—Fulwider Patton Rieber Lee & Utecht

[57] ABSTRACT

This is a method for extrusion of materials normally difficult to extrude, particularly cement mixtures, especially such mixtures as asbestos and cement and the like, in which the invention and method is characterized by a special mixing method of the ingredients and by particular inorganic additive for plasticity, in which water and cement are mixed before mixing with other ingredients and/or fumed silica is used in the mix.

4 Claims, 2 Drawing Figures

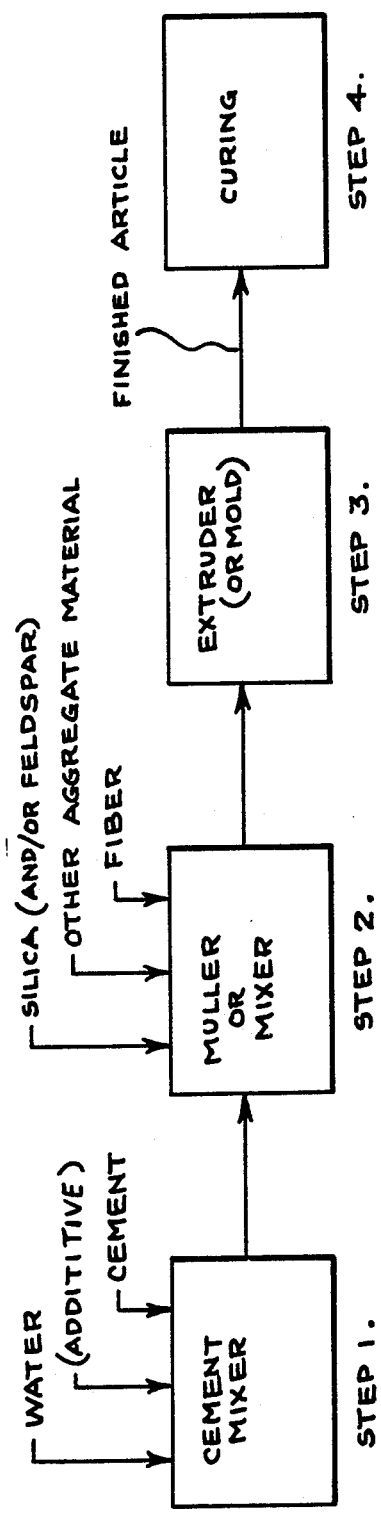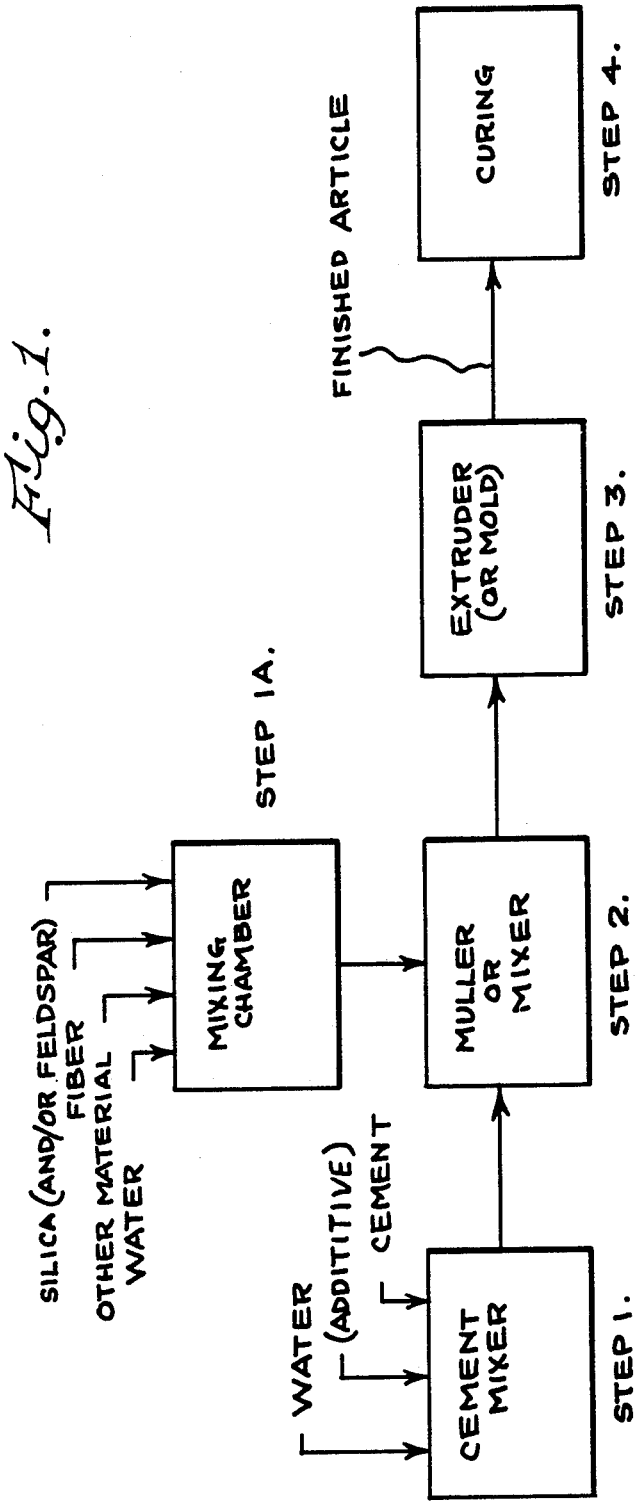

METHOD FOR EXTRUSION

BACKGROUND OF THE INVENTION

1. FIELD OF THE INVENTION

This invention is in the general field of extrusion of materials, and particularly is in the field of extrusion of cementitious mixtures, especially those mixtures in which fibres, such as asbestos fibres are used.

2. DESCRIPTION OF THE PRIOR ART

The principal prior art known to me relating to the extrusion of asbestos and cement mixtures, and the like is that art described in the following listed U.S. Pat. Nos.:

3,526,691;

3,529,981;

3,552,985;

3,219,467.

It is noted that in one form, the extrusion of asbestos and cement articles is made possible by the use of organic additives to the mixtures. It is further noted that in another series of patents the extrusion is accomplished by a precise mixing of water together with dry ingredients.

I know of no prior art in which the special mixing processes of my invention reduces the water to near the absolute amount required, and actually utilized, by the cement itself, and in which the water and cement are pre-mixed, and/or in which an inorganic additive is used for increased plasticity.

SUMMARY OF THE INVENTION

For many years, major concerns, and many individuals throughout the world, have attempted to extrude mixtures of Portland cement together with other materials, and especially asbestos or other fibres.

Mixtures of a cementitious product and especially with asbestos and certain other fibres cause great problems in the extrusion process in view of the fact that there are many difficulties, many of which are pointed out in the patents heretofore cited.

I have now discovered that by a precise mixture of the exact desired amount of water, together with the cement itself, prior to the addition of asbestos fibres or any other items to be used, that the maximum quality and efficiency may be obtained, with the minimum of difficulty.

I have discovered certain inorganic additives which may be used to prevent dewatering, even if excessive water is used, and to enhance extrudability and plasticity.

In my particular invention, I first mix precise quantities of Portland cement or other cementitious product with the precise amount of water required for proper hydration of the cementitious material and such other materials as might be appropriately used. Thereafter, I provide for the thorough intermixing with the already wet cement product of the fibres and/or other materials which might be desired to be added.

In many instances, it is desirable to add some material for appropriate plasticizing and/or holding of the water in the mixture. In those instances, I have found that fumed silica, or the like, may be most advantageously used and results in a very plastic and workable material heretofore unknown, except by the use of the undesirable organic materials. And, in those cases where silica is a part of the mixture, the fumed silica becomes in integral part of the entire mass without adverse side effects.

Avoiding the use of organic additives, such as are outlined in U.S. Pat. No. 3,219,467, is particularly important in many instances and especially where certain specifications must be met and in which organic additives are not allowed. For example, ASTM (American Society for Testing and Materials) specification C–44 –71 particularly states that organic additives are not allowed (Section 5).

I have discovered likewise, that the addition of quantities of feldspar may improve plasticity and workability and will make the process more economical because many times naturally occuring mixtures of silica and feldspar are found which are more economical than the nearly pure silica heretofore used.

It is an object of this invention to provide a method for premixing the materials to be used in the extrusion of cementitious articles, especially where mixed with fibres, in which the exact desired amount of water or liquid is mixed with the precise amount of cementing material to provide a proper and most efficient cementing material;

It is a further object of this invention to provide a method for mixing, sequentially, the cementitious material with its fluid in the ultimate desirable proportions; thereafter adding fibres and/or other materials desired in the final product, pressure shaping the article and curing said article;

It is a further object of this invention to provide the foregoing to include the shaping of the article therein by extrusion;

It is a further object of this invention to provide appropriate inorganic additive for the purpose of enhancing extrudability and to increase plasticity;

It is a further object of this invention to provide a method as herein described in which mixtures of silica and feldspar may be used to advantage in such products.

The foregoing and other objects and advantages of this invention will be clear to those skilled in the art upon reading the description of a preferred embodiment which follows, in conjunction with the appended drawings.

BRIEF DESCRIPTION OF THE DRAWINGS

FIG. 1 is a schematic diagram of a preferred embodiment of the method of this invention; and FIG. 2 is a schematic diagram of an alternate embodiment of the method of this invention.

DESCRIPTION OF THE PREFERRED EMBODIMENT

In a preferred embodiment, Portland cement, or the like, will be mixed with all, or a major part of the ultimate desired amount of water for the entire mixture. This is Step 1 as indicated in FIG. 1. The Portland cement and water are thoroughly intermixed in a customary cement mixer, or in a paddle mixer, or the like, all of which are well known in the art. If desired for special uses, an additive may be added here also.

When the Portland cement has been thoroughly and completely dissolved with water, it may be maintained for that period of time required to commence the initial reactions frequently deemed desirable, before further mixing with the other ingredients.

At this point the cement and water has now formed the best adhesive or cementing material to be used in combining with the aggregates which will be added (Step 2). In the case of a fibrous mixture such as asbestos and cement, the aggregates will consist of asbestos fibres and/or such other materials as silica, pearlite, feldspar or other materials.

It is most interesting to note that the addition of a natural combination of feldspar and silica, finely ground, makes a particularly advantageous mix in that the feldspar adds certain plasticity and the like to the mixture, and the silica makes it possible for the cement products to combine in steam curing to form calcium silicates in a manner which is well known in the art. Where a complete slurry of feldspar, silica, and the other ingredients is attempted or, even where a dry mix of all articles is attempted, with complete addition of the water, the silica and feldspar and cement may tend to segregate due to density variations and the cement may not ever all be completely wet, but in this method these deficiencies are overcome, as the cement is thoroughly wet in the initial step.

It will be observed that in a preferred form the silica and asbestos fibres with or without feldspar or other aggregates will be mixed together and added to the cement mixture.

It should be noted here that the use of silica (in finely ground form) is well known in the asbestos-cement art. Such use of silica is primarily concerned with a chemical reaction which takes place when the final article is cured under high pressure steam. In those instances where such curing is not used, and/or where water curing or other curing not involving high-pressure steam is utilized, cement, water and asbestos fibres or the like (together with other aggregates in some cases) may be the only materials. In such instances, the method revealed is still the desirable method and is the method of this invention, since the thorough mixing of water and cement prior to the addition of the fiber to the mix allows the cement to be thoroughly wet and the full effect to be gained as in those cases where silica or other articles may be involved.

After the thorough mixing of any of the fiber and other aggregates, other than cement and water, the water is placed into the dry mixed material (or the dry mixed material is placed with the water) and is further thoroughly mixed in a muller or mixer as is well known in the art. The type of equipment may readily be the equipment revealed in the U.S. patent heretofore mentioned.

After thorough mixing, the material is placed in a mold for pressure forming, or in an extruder for extrusion forming. The methods of molding under pressure and extruding are well known in the art and need no reference here. Extrusion is described, among other places, in the patent referred to above.

The finished article may then be transferred to the curing cycle. The curing cycle, or cycles, are well known in the art and might include atmospheric curing, water curing, steam curing, or initial curing with carbon dioxide, such as, for example, as indicated in my U.S. Pat. Nos. 3,356,779 and 3,549,737. The latter initial curing methods by the use of carbon dioxide are particularly advantageous when excessive plasticity is achieved, by the use of fumed silica, or the like, and the combined use of excessive amounts of water to provide unusual plasticity and workability for the mixtures.

In an alternative form of this method, as shown in FIG. 2, it may sometimes be desirable to combine the mixing of some amount of water with the fibre silica, and/or other aggregate materials prior to mixing such materials with the water and cement mixture. FIG. 2 shows this process as Step 1A. Otherwise it is clear that the balance of the operation is the same.

When it is desired to retain excess quantities of water within the mixture and/or to provide unusual plasticity, particularly where coarse, long and large quantities of fibre are used, additions of small amounts of additives may be desirable either in Step 1 or Step 2, or in Step 1A. The additives as revealed in heretofore referenced U.S. Pat. No. 3,219,467 may even be deemed desirable in some instances.

On the other hand, the addition of small amounts of fumed silica is deemed to be most advantageous to certain types of extrusion of the cementitious mixtures to which this patent application is directed. The fumed silica has the advantages of being inorganic, of combining with the other articles fully and completely and of actually adding unusual and superior extrudability qualities to such materials. Fumed silica is a particular form of silica, well known in the art and is well exemplified by the trade name "Cab-O'Sil" as produced by the Cabot Corporation of Boston, Mass. While fumed silica is well known, the unusual affect of fumed silica in connection with the extrusion of the cementitious products mentioned in this application have not heretofore been known nor realized.

By mixing the fumed silica or other appropriate inorganic materials having similar qualities with the type of mixture referred to for the use of this method, the entire material is made to become interestingly thixotropic and unusually adaptable to extrusion for the reason that during the actual working in the equipment and the forcing in the dies this material will be very fluid and pliable. Immediately upon the cessation of the forces applied, which forces are shear forces, and upon emergence from the dye, where such forces have ceased, the material immediately holds its shape. The fumed silica, or the like, additionally has the great advantage over any other materials which might be added that it combines with the other inorganic materials to make the most desirable ultimate product.

The various mixtures of different items are well known in the art and some of such mixtures are exemplified in the U.S. patents heretofore referred to in this application for U.S. patent.

As examples of mixtures, however, it may be desirable to make a mixture in which the final mixture of materials to be formed will include approximately 20 percent asbestos fibers, approximately 20 percent water, approximately 40 percent Portland cement and approximately 30 percent silica flour, by weight.

As alternatives, the mixtures by weight can be 20 percent water, 25 percent cement, 20 percent asbestos, 30 percent silica and 15 percent feldspar. This particular mixture has increased extrudability and is therefore especially important.

As further alternatives, the mixture can be by weight from 20 to 30 percent water, from 10 to 30 percent asbestos and the balance all Portland cement or mixtures of Portland cement with aggregates in any well known and acceptable formulations and percentages.

In all of the foregoing mixtures it may be desirable for the ultimate increased plasticity, to replace one-half of 1 percent or more up to as much as 5 percent of other ingredients with fumed silica or the like. The fumed silica may also be used in the other methods of extrusion known and it is felt that the use of such material because of the advantages already outlined is inventive in itself.

Where it is particularly desired to make light weight products and the like, the percentage of water may be greatly increased by the appropriate addition of fumed silica and the other ingredients in the mixture may be relatively decreased and/or replaced with light weight materials, such as pearlite, and the like. The addition of such articles to asbestos cement, as pearlite, vermiculite, saw dust and the like is well known to those skilled in the art of asbestos cement, but never before has it been susceptible of such excellent use as by the methods of this invention.

While the foregoing described methds are fully capable of keeping the objects and advantages of this invention, it is not my intention that the same be limiting.

I claim:

1. The method of extruding asbestos cement in which fumed silica is added to said asbestos cement for the purpose of increasing plasticity.

2. The method for pressure forming articles from mixtures of asbestos cement and water including the addition of fumed silica to said mixtures prior to the pressure forming.

3. The method for forming concrete articles including: (1) mixing cement and water in a mixing zone; (2) mixing said mixture of cement and water with aggregate and fumed silica in a mixing zone; (3) placing the resultant mixture in a pressure forming device; (4) forcing the said resultant mixture, by pressure, into a shaped article; (5) removing said shaped article from the forming device; and (6) curing the article formed by said pressure forming device.

4. The method of claim 3 in which the shaped article is subjected to a carbondioxide atmosphere immediately after removal from the pressure forming device and prior to further curing.

* * * * *